United States Patent
Bülow

(10) Patent No.: US 7,486,898 B2
(45) Date of Patent: Feb. 3, 2009

(54) RECEIVER FOR PMD MITIGATION BY POLARIZATION SCRAMBLING

(75) Inventor: Henning Bülow, Kornwestheim (DE)

(73) Assignee: Alcatel, Paris (FR)

( * ) Notice: Subject to any disclaimer, the term of this patent is extended or adjusted under 35 U.S.C. 154(b) by 428 days.

(21) Appl. No.: 11/296,515

(22) Filed: Dec. 8, 2005

(65) Prior Publication Data

US 2006/0153575 A1    Jul. 13, 2006

(30) Foreign Application Priority Data

Jan. 7, 2005    (EP) ................. 05290047

(51) Int. Cl.
*H04B 10/06*    (2006.01)

(52) U.S. Cl. ............ 398/209; 398/155; 398/154; 398/205; 398/65; 398/152

(58) Field of Classification Search ........... 398/155, 398/154, 152, 81, 209, 205, 65
See application file for complete search history.

(56) References Cited

U.S. PATENT DOCUMENTS

| | | | | |
|---|---|---|---|---|
| 6,538,786 B1 * | 3/2003 | Naito | ............ | 398/152 |
| 6,583,903 B1 * | 6/2003 | Way et al. | ............ | 398/152 |
| 6,941,078 B1 * | 9/2005 | Onaka | ............ | 398/155 |
| 6,959,152 B2 * | 10/2005 | Fujiwara et al. | ............ | 398/81 |
| 2001/0022826 A1 * | 9/2001 | Rude | ............ | 375/371 |
| 2003/0039427 A1 * | 2/2003 | Yamaguchi | ............ | 385/11 |
| 2006/0083328 A1 * | 4/2006 | Green et al. | ............ | 375/295 |

OTHER PUBLICATIONS

Zhihong Li; Jinyo Mo; Yi Dong; Yixin Wang; Chao Lu: "Experimental evaluation of the effect of polarization scrambling speed on the performance of PMD mitigation using FEC" Optical Fiber Communication Conference (OFC), Feb. 23, 2004, pp. 1-3, XP002329735, Washington DC, USA.
Moller L; Chandrasekhar S; Sinsky J H; Buhl L L: "Novel RZ receivers with enhanced jitter and PMD tolerance" Optical Fiber Communications Conference (OFC), vol. 2, 2002, pp. 1-4, XP002329736, Washington DC, USA.
Haustein H F; Schlenk R; Kallert H M; Pauli V A: "BER measurements of a 40Gb/s receiver with adaptive threshold using polarization scrambling" 2003 Digest of the Leos Summer Topics Meeting, Jul. 16, 2003, pp. 17-18, XP002329737 Vancouver, BC, Canada.
X. Liu, et al.: "Experiamental Demonstration of Broadband PMD Mitigation through Distributed Fast Polarization Scrambling and FEC", pp. 1-2, ECOC 2004.

* cited by examiner

*Primary Examiner*—Kenneth N Vanderpuye
*Assistant Examiner*—Hibret A Woldekidan
(74) *Attorney, Agent, or Firm*—Sughrue Mion, PLLC

(57) ABSTRACT

A receiver (10) for an optical signal containing a time jitter and a time-varying distortion caused by a periodic polarization scrambled signal comprises at least one decision gate (11) and a clock recovery module (13) providing a clock signal (C) recovered from the optical signal to the at least one decision gate (11). The receiver (10) further comprises a scrambling frequency generator (16) synchronized to the scrambling frequency and phase of the polarization scrambled signal, a jitter function generator (17) generating a clock phase control signal ($\Delta\phi_b$) reproducing the time jitter, and at least one clock phase modulator (14) modulating the phase of the clock signal (C) according to the clock phase control signal ($\Delta\phi_b$).

11 Claims, 2 Drawing Sheets

RECEIVER FOR PMD MITIGATION BY POLARIZATION SCRAMBLING

The invention is based on a priority application EP 05290047.9 which is hereby incorporated by reference.

FIELD OF THE INVENTION

The invention relates to a receiver for an optical signal containing a time jitter and a time-varying distortion caused by a periodic polarization scrambled signal, comprising at least one decision gate and a clock recovery module providing a clock signal recovered from the optical signal to the at least one decision gate.

BACKGROUND OF THE INVENTION

Polarization mode dispersion (PMD) is one of the major obstacles in high-speed (bit-rates of 10 to 40 Gb/s) long-haul transmissions. In order to mitigate PMD, distributed polarization scrambling in conjunction with forward error correction (FEC) has been proposed in the paper "Experimental Demonstration of Broadband PMD Mitigation through Distributed Fast Polarization Scrambling and FEC" by X. Liu et al. in an ECOC 2004 post-deadline session.

The principle of this proposed method of PMD mitigation is shown in FIG. 3: An optical fiber line 1 for transmission of optical signals at a high bit-rate is arranged between an optical transmitter 2 and an optical receiver 3. A plurality of fast polarization scramblers 4 are successively distributed along the fiber line 1 between successive fiber links 5. The purpose of the polarization scramblers 4 is to provide a scrambling signal performing a periodic polarization change of the optical signals transmitted through the fiber line 1 and thus to shorten the duration of the interference of adjacent bit pulses 7 transmitted with a time spacing $T_s$ reciprocal to the bit-rate (e.g. $T_B$=25 ps) into such a short time that the associated bit errors can effectively be corrected by an error correction scheme (forward error correction, FEC). The polarization scramblers 4 work at polarization modulation rates of some 10 MHz (e.g. $f_{scr}$=20 MHz). A forward error correction decoder 8 is arranged in succession to the receiver 3 for decoding redundant bits being present in the optical signal in addition to information bits and compensating for transmission errors of the information bits by using the redundant bits.

The optical receiver 3 samples the optical signal at a sampling rate corresponding to the bit-rate of the optical signal. In the presence of fiber PMD, the polarization scramblers 4 generate a time jitter 6 of the bit pulses 7 with a period $T_s$=1/$f_{scr}$ reciprocal to the scrambling frequency $f_{scr}$. As a result, the bit pulses 7 are time-shifted in their bit slots according to the time jitter 6, i.e. the bit pulses 7 arrive earlier or later than is the case when no jitter is present. In addition, the actual PMD distortion 9 changing periodically within the scrambling period $T_s$ leads also to a changing eye opening and thus to a variation of the optimum position of a decision gate threshold $U_{th}$ of the receiver 3 for minimum error probability. As a result, the error probability of the receiver 3 is increased.

Since the envisaged high scrambling rates $f_{scr}$ are beyond the tracking ability of the clock recovery of the receiver 3, the receiver 3 cannot compensate for the jitter 6. Beside this, the changing of the threshold $U_{th}$ is not taken into account. When increasing the PMD mitigation effectiveness of this scheme in the next future, e.g. when incorporating enhanced FEC (UFEC), the jitter will become the limiting factor.

In the paper "Novel RZ Receivers with Enhanced Jitter and PMD tolerance" by L. Möller et al., OFC 2002 Postdeadline Papers, an optical RZ receiver is described which uses two or more sampling points per bit slot. The decisions corresponding to the sampling points are then combined by a logical OR operation in order to reduce an error probability of the receiver. However, the proposed optical receiver works only with RZ (not NRZ) signals. As in the presence of PMD, even RZ signals are "converted" to broader NRZ-like signals, the proposed receiver is not likely to be applicable in the present case.

OBJECT OF THE INVENTION

It is the object of the invention to provide a receiver which takes into account the jitter induced by the scrambling, and in particular also the threshold variation induced by the scrambling, thus reducing an error probability of the receiver.

SHORT DESCRIPTION OF THE INVENTION

This object is achieved by a receiver of the above-mentioned kind further comprising a scrambling frequency generator synchronized to the scrambling frequency and phase of the polarization scrambled signal, a jitter function generator generating a clock phase control signal reproducing the time jitter, and at least one clock phase modulator modulating the phase of the clock signal according to the clock phase control signal.

The information about the optical signal's scrambling can be extracted from the clock recovery module and used to synchronize the scrambling frequency generator to the scrambling frequency and the scrambling phase. The scrambling frequency generator commands the jitter function generator, which contains the temporal evolution of the signal jitter within a scrambling period.

The output of the jitter function generator controls the clock phase modulator at the decision gate's clock input to keep the decision time in the optimum position of the bit.

In this way, the clock of the decision gate is phase modulated according to the jitter so that even the jittered bits are always sampled at the optimum decision time at the decision gate. The shift in the bit pulse arrival times caused by the jitter is compensated by accordingly shifting the sampling times of the decision gate. Hence higher jitter with lower penalty can be tolerated and the PMD mitigation of this scheme is more effective than that of receivers known in the art.

In a preferred embodiment, a threshold function generator generates a threshold control signal which reproduces the optimum threshold for the time-varying distortion and which is provided as an input to the at least one decision gate, so that the decision gate's threshold is directly controlled by the threshold control signal.

Thus, the scrambling frequency generator output also commands a threshold function generator, which contains the temporal evolution of the optimum threshold amplitude (voltage) within a scrambling period. The output of the threshold function generator is connected to the decision gate's threshold input to keep the decision threshold in the optimum position of the bit.

In a preferred modification of this embodiment a compensation control device is provided which controls the jitter function generator and the threshold function generator in such a way that an error count of decided bits of the decision gate is minimized. In this way, the clock phase control signal and the threshold can be adapted such that errors of the decision gate are minimized.

In a further modification, a forward error correction decoder for performing the error count is provided. The decoder uses redundant bits contained in the optical signal to detect and correct for bit errors.

In a highly preferred modification, a multiplexer connects one of a plurality of decision gates to the forward error correction decoder, the decision gate being selected by a switching function generator connected to the compensation control device and the scrambling frequency generator.

In this modification, the time dependent (within a scrambling period) decision time and threshold are "quantizised" by operating two or more decision gates in parallel having different thresholds and sampling phases. Within a scrambling period, the optimum gate is selected by the multiplexer, which is commanded by the scrambling frequency generator synchronized to the signal's scrambling. The selection of the optimum (for min. error probability) decision gate within a sampling period is done in the switching function generator whose selection rule is optimized by minimizing the error probability. Also, the individual sampling phases and/or the individual thresholds can be optimized by the compensation control device in order to minimize the error probability.

In a further preferred embodiment, the jitter function generator and the threshold function generator comprise an amplitude control device and a phase control device for controlling the amplitude and the phase of the clock phase control signal, respectively the threshold control signal, so that the function generators can easily follow the time jitter, respectively the time-varying distortion.

In another embodiment, the scrambling frequency generator is connected to the clock recovery module extracting the periodic polarization scrambled signal from the optical signal. In this way, synchronizing the scrambling frequency generator to the scrambling frequency and phase of the polarization scrambled signal is simplified.

In another preferred embodiment, a photodiode succeeding a polarizer extracting a polarization scrambling related signal from the optical signal and providing it to the scrambling frequency generator are provided. The combination of a polarizer with a (slow) photodiode provides an easy means for direct measuring of the polarization modulation generated by the periodic polarization scrambled signal.

In yet another preferred embodiment, the scrambling frequency generator is preset to the frequency and phase of the periodic polarization scrambled signal. A precise pre-setting of the scrambling frequency generator to the scrambling frequency may eliminate the need for extracting the polarization scrambled signal from the optical signal.

The invention is also realized in a fiber optical system with a receiver as described above, comprising an optical fiber line with a plurality of successively arranged polarization scramblers for polarization modulation of the optical signal. The polarization scramblers are distributed along the fiber line for mitigating polarization mode dispersion.

Further advantages can be extracted from the description and the enclosed drawing. The features mentioned above and below can be used in accordance with the invention either individually or collectively in any combination. The embodiments mentioned are not to be understood as exhaustive enumeration but rather have exemplary character for the description of the invention.

DESCRIPTION OF THE INVENTION

Figure 1:
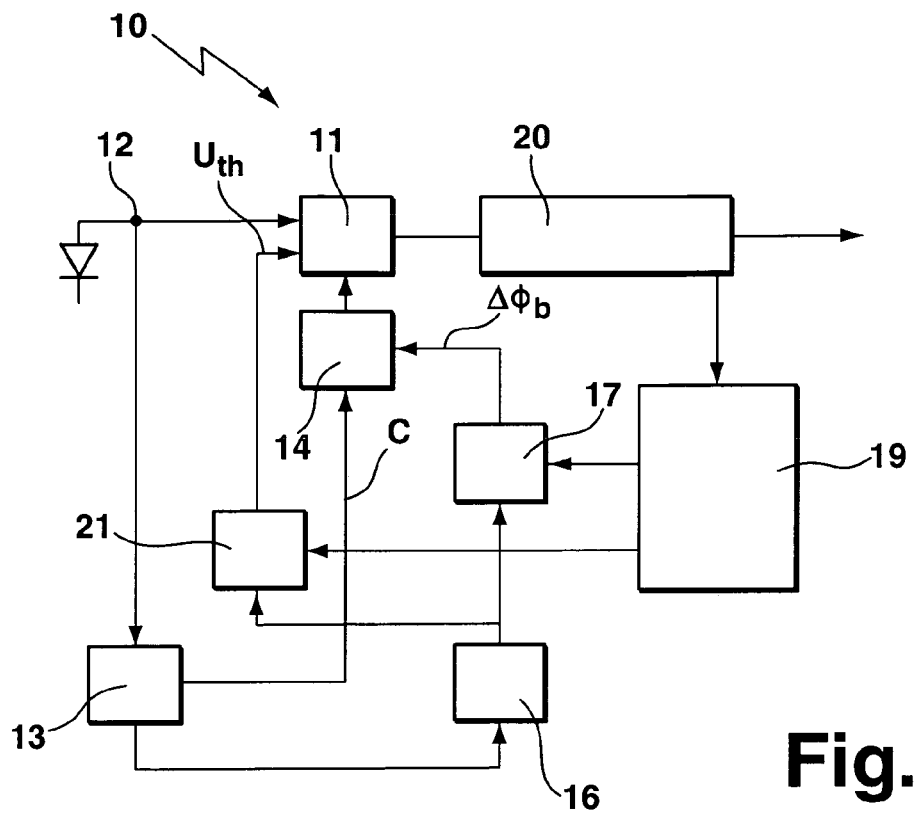
FIG. 1 shows a first embodiment of a receiver according to the invention with one decision gate.

FIG. 1 shows a receiver 10 comprising a decision gate 11 which is connected to a photo-diode 12 arranged at the input of the receiver 10. The receiver 10 is provided for receiving an optical signal transmitted through the optical fiber line 1 shown in FIG. 3. The optical signal contains a periodic time jitter 6 and a time-dependent distortion 9 caused by a periodic scrambling generated by the polarization scramblers 4 of FIG. 3. The decision gate 11 serves to convert bit pulses contained in the optical signal to a bit stream consisting of only two binary values (0 or 1). For deciding whether a bit pulse should be counted as 0 or 1, a decision threshold signal $U_{th}$ is delivered as an input to the decision gate 11. Signal amplitudes of bit pulses above the threshold $U_{th}$ are identified as 1, signal amplitudes below the threshold are identified as 0.

Figure 3:
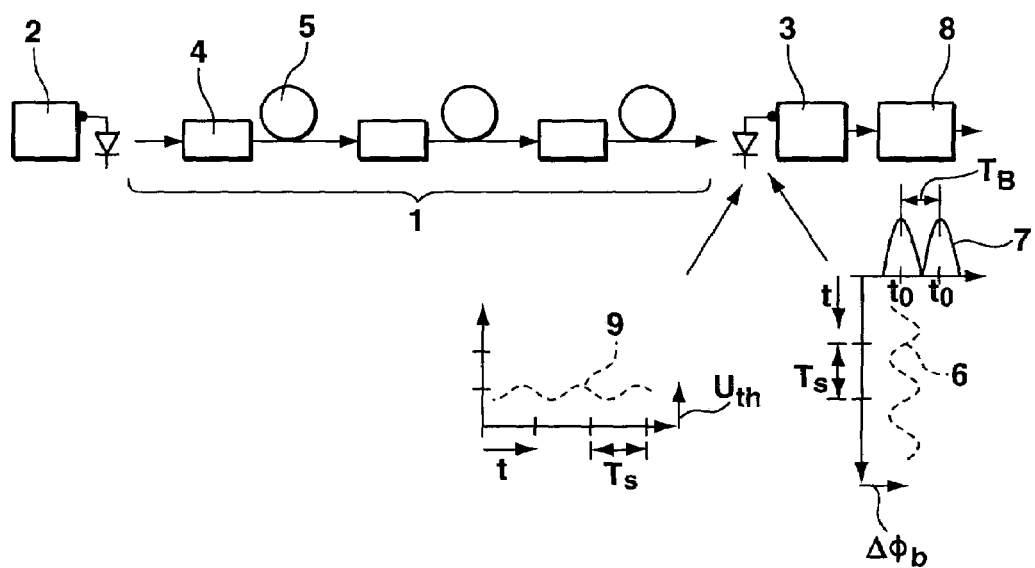
FIG. 3 shows a fiber optical system with a receiver according to prior art.

A clock recovery module 13 is also connected to the input 12 of the receiver 10 and provides a clock signal C to the decision gate 11 (frequency 40 GHz, corresponding to the bit-rate) which is recovered from the optical signal. The clock signal C determines the decision time (sampling time) of the decision gate 11. The decision time $t_0$ shown in FIG. 3 is optimal when the sampling is performed at the maximum values of the incoming bit pulses. When no PMD is present, maximum values of the bit pulses 7 of FIG. 3 arrive at the center of their bit slots at the decision gate 11, such that the optimum decision time is always attained. When PMD-induced time jitter 6 is present, the optimal decision time $t_0$ varies with the oscillation frequency of the polarization scrambled signal.

This variation can be compensated by shifting the clock signal C in a clock phase modulator 14 according to a clock phase control signal $\Delta\phi_b$ which reproduces the time jitter 6, such that the optimum decision time $t_0$ can always be attained. For this purpose, the time function of the time jitter 6 derived from the scrambling signal is reproduced in frequency, phase and amplitude as precisely as possible in a jitter function generator 17 generating the clock phase control signal $\Delta\phi_b$.

Analogously, a variation of the optimum decision threshold of the decision gate 11 due to the time-varying distortion 9 (cf. FIG. 3) caused by the polarization scrambled signal is compensated by shifting the threshold using a threshold control signal $U_{th}$ generated in a threshold function generator 21, reproducing the time-varying distortion 9 as precisely as possible. The threshold of the decision gate 11 is shifted by the threshold control signal $U_{th}$ so that the optimum decision threshold can always be attained.

The jitter function generator 17 and the threshold function generator 21 are connected to a scrambling frequency generator 16 (oscillator, counter, etc.) which is locked in frequency and phase to the periodic polarization scrambled signal (frequency 20 MHz) being recovered from the optical signal in a phase comparator of the clock recovery module 13.

Alternatively, recovery of the polarization scrambled signal can be performed by a direct measurement of the polarization modulation, for example by using a polarizer and a photodiode as a measuring device. It is also possible to preset the scrambling frequency generator 16 to the frequency and phase of the periodic polarization scrambled signal.

The amplitude and phase of the clock phase control signal $\Delta\phi_b$ as well as of the threshold control signal $U_{th}$ are controlled in an amplitude control device and a phase control device (not shown) being part of the jitter function generator 17 and the threshold function generator 21, respectively. The function generators 17, 21 are connected to a compensation control device 19 for jitter and threshold compensation control. The compensation control device 19 is used for setting the amplitude and phase of the clock phase control signal $\Delta\phi_b$ and the threshold control signal $U_{th}$ in such a way that a bit error count measured in a forward error correction decoder 20 connected to the compensation control device 19 is minimized.

Figure 2:
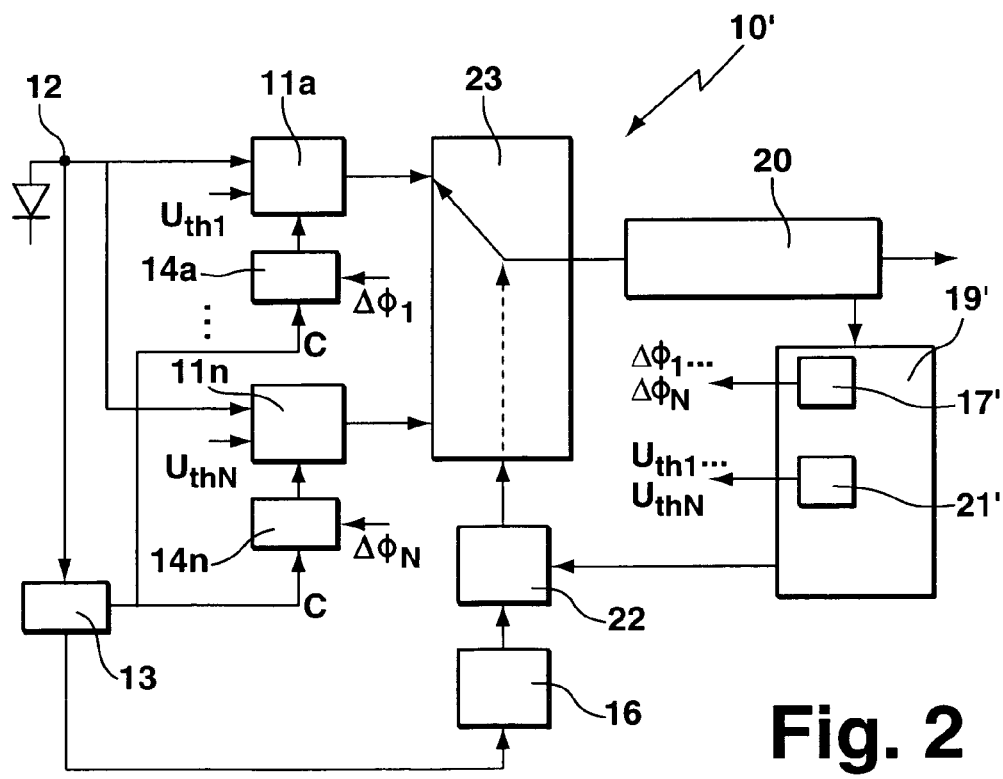
FIG. 2 shows a second embodiment of a receiver according to the invention with a plurality of decision gates.

FIG. 2 shows a receiver 10' which is modified with respect to the receiver 10 of FIG. 1 in that a plurality of parallel decision gates 11a to 11n is used and their decision time and threshold are "quantizised", i.e. they have different (fixed) thresholds and sampling phases (within a scrambling period). Each of the decision gates 11a to 11n receives its own individual threshold control signal $U_{th1}$ to $U_{thN}$ generated in a common threshold function generator 17' being part of a compensation control device 19'. Each of the decision gates 11a to 11n is also connected to its own clock phase modulator 14a to 14n to which an individual clock phase control signal $\Delta\phi_1$ to $\Delta\phi_N$ is applied, which is generated in a common jitter function generator 21', also being part of the compensation control device 19'.

Within a scrambling period, the optimum decision gate is selected by a multiplexer 23, which is commanded by the scrambling frequency generator 16 synchronized to the optical signal's scrambling. The selection of the optimum (for min. error probability) decision gate within a sampling period is done in a switching function generator 22 connected to the compensation control device 19', whose selection rule is optimized by minimizing the error probability. Also, the individual clock phase control signals $\Delta\phi_1$ to $\Delta\phi_N$ and/or the individual threshold control signals $U_{th1}$ to $U_{thN}$ can be optimized by the compensation control device 19' to minimize error probability.

The receivers of FIGS. 1 and 2 are advantageously used in conjunction with an arrangement of the type of FIG. 3, such that a fiber optical system is provided capable of compensating for the time jitter 6 as well as for the time-varying distortion 9 caused by the polarization scramblers 4. In this way, the decision quality of the decision gate(s) 11 can be optimized and the effectiveness of the PMD mitigation by scrambling can be increased. Moreover, the receivers 10; 10' allow for extension to UFEC with higher PMD mitigation efficiency.

Only low/medium speed electronics has to be implemented within the receiver ASIC, alternatively a medium speed DSP is possible as a module of the receivers 10; 10' and can be used whenever low-cost PMD mitigation by polarization scrambling is of interest.

The invention claimed is:

1. A receiver for an optical signal containing a polarization mode dispersion-induced (PMD-induced) periodic time jitter and a time-varying distortion caused by a periodic polarization scrambled signal, comprising:
    at least one decision gate and a clock recovery module providing a clock signal recovered from the optical signal to the at least one decision gate,
    a scrambling frequency generator connected to the clock recovery module, extracting the periodic polarization scrambled signal from the optical signal, and the scrambling frequency generator is synchronized to the scrambling frequency and phase of the periodic polarization scrambled signal,
    a jitter function generator connected to the scrambling frequency generator which is locked in frequency and phase to the periodic polarization scrambled signal being recovered from the optical signal, and the jitter function generator generating a clock phase control signal reproducing the PMD-induced periodic time jitter, and
    at least one clock phase modulator modulating the phase of the clock signal according to the clock phase control signal.

2. The receiver according to claim 1, further comprising a threshold function generator which generates a threshold control signal reproducing the optimum threshold for the time-varying distortion, provided as an input to the at least one decision gate.

3. The receiver according to claim 2, further comprising a compensation control device which controls the jitter function generator and the threshold function generator in such a way that an error count of decided bits of the decision gate is minimized.

4. The receiver according to claim 3, further comprising a forward error correction decoder for performing the error count.

5. The receiver according to claim 4, wherein a multiplexer connects one of a plurality of decision gates to the forward error correction decoder, and the decision gate is selected by a switching function generator connected to the compensation control device and the scrambling frequency generator.

6. The receiver according to claim 2, wherein the jitter function generator and the threshold function generator comprise an amplitude control device and a phase control device for controlling the amplitude and the phase of the clock phase control signal, respectively the threshold control signal.

7. The receiver according to claim 1, wherein the scrambling frequency generator is connected to the clock recovery module extracting the periodic polarization scrambled signal from the optical signal.

8. The receiver according to claim 1, wherein a photodiode succeeds a polarizer extracting a polarization scrambling related signal from the optical signal and provides the extracted polarization scrambling related signal to the scrambling frequency generator.

9. The receiver according to claim 1, wherein the scrambling frequency generator is preset to the frequency and phase of the periodic polarization scrambled signal.

10. A fiber optical system with a receiver for an optical signal containing a polarization mode dispersion-induced (PMD-induced) periodic time jitter and a time-varying distortion caused by a periodic polarization scrambled signal, comprising:
    at least one decision gate and a clock recovery module providing a clock signal recovered from the optical signal to the at least one decision gate,
    a scrambling frequency generator connected to the clock recovery module, extracting the periodic polarization scrambled signal from the optical signal, and the scrambling frequency generator is synchronized to the scrambling frequency and phase of the periodic polarization scrambled signal,
    a jitter function generator connected to the scrambling frequency generator which is locked in frequency and phase to the periodic polarization scrambled signal being recovered from the optical signal, and the jitter function generator generating a clock phase control signal reproducing the PMD-induced periodic time jitter, and
    at least one clock phase modulator modulating the phase of the clock signal according to the clock phase control signal, the fiber optical system comprising an optical fiber line with a plurality of successively arranged polarization scramblers for polarization modulation of the optical signal.

11. A method for sampling an optical signal containing a polarization mode dispersion-induced (PMD-induced) periodic time jitter and a time-varying distortion caused by a periodic polarization scrambled signal at an optimal decision time in at least one decision gate of a receiver, comprising the steps of:

providing a clock signal recovered from the optical signal to the at least one decision gate, extracting the periodic polarization scrambled signal from the optical signal after clock recovery of the optical signal, reproducing the scrambling frequency and phase of the periodic polarization scrambled signal, generating a clock phase control signal reproducing the PMD-induced periodic time jitter from the reproduced scrambling frequency and phase of the periodic polarization scrambled signal, and modulating the phase of the clock signal of the at least one decision gate according to the clock phase control signal.

* * * * *